United States Patent [19]

Zink et al.

[11] 3,901,636

[45] Aug. 26, 1975

[54] PLASTIC EXTRUSION AND ODOR ELIMINATION APPARATUS

[75] Inventors: Stanley C. Zink, Beloit, Wis.; William R. Penrod, Rockton, Ill.

[73] Assignee: Beloit Corporation, Beloit, Wis.

[22] Filed: June 11, 1973

[21] Appl. No.: 368,958

[52] U.S. Cl. ............... 425/378; 425/463; 156/244
[51] Int. Cl.² ........................ B29D 7/02; B29F 3/08
[58] Field of Search .................. 425/131, 378, 463; 156/243, 244

[56] References Cited
UNITED STATES PATENTS

| | | | |
|---|---|---|---|
| 2,952,873 | 9/1960 | Porter | 425/463 |
| 3,405,425 | 10/1968 | Buckley et al. | 425/131 |
| 3,416,190 | 12/1968 | Mehnert | 425/378 X |
| 3,761,211 | 9/1973 | Parkinson | 425/131 |
| 3,797,987 | 3/1974 | Marion | 425/463 |

Primary Examiner—R. Spencer Annear
Attorney, Agent, or Firm—Dirk J. Veneman; Bruce L. Samlan; Gerald A. Mathews

[57] ABSTRACT

Odor elimination apparatus for plastic film in which at least two extruded plastic films are combined outside of the die. The apparatus utilizes a valve adapting a single extruder to supply two melt streams to a dual melt chamber dual slot die. One melt chamber of the dual slot die is heated to a temperature below the temperature of oxidation of the resin of the thermoplastic material extruded through the die. The other melt chamber is heated above the oxidation temperature of the thermoplastic material extruded through the die, to increase the adhesive qualities of the extruded film to effectively bond with the thermoplastic material heated to a low temperature. The two films are then combined and the high temperature film is sandwiched between the low temperature film and a substrate, trapping the odor of the high temperature film. In a modified form of the invention, the film heated to a high temperature is passed through a tortuous path and heated to its high temperature while passing through this path.

4 Claims, 6 Drawing Figures

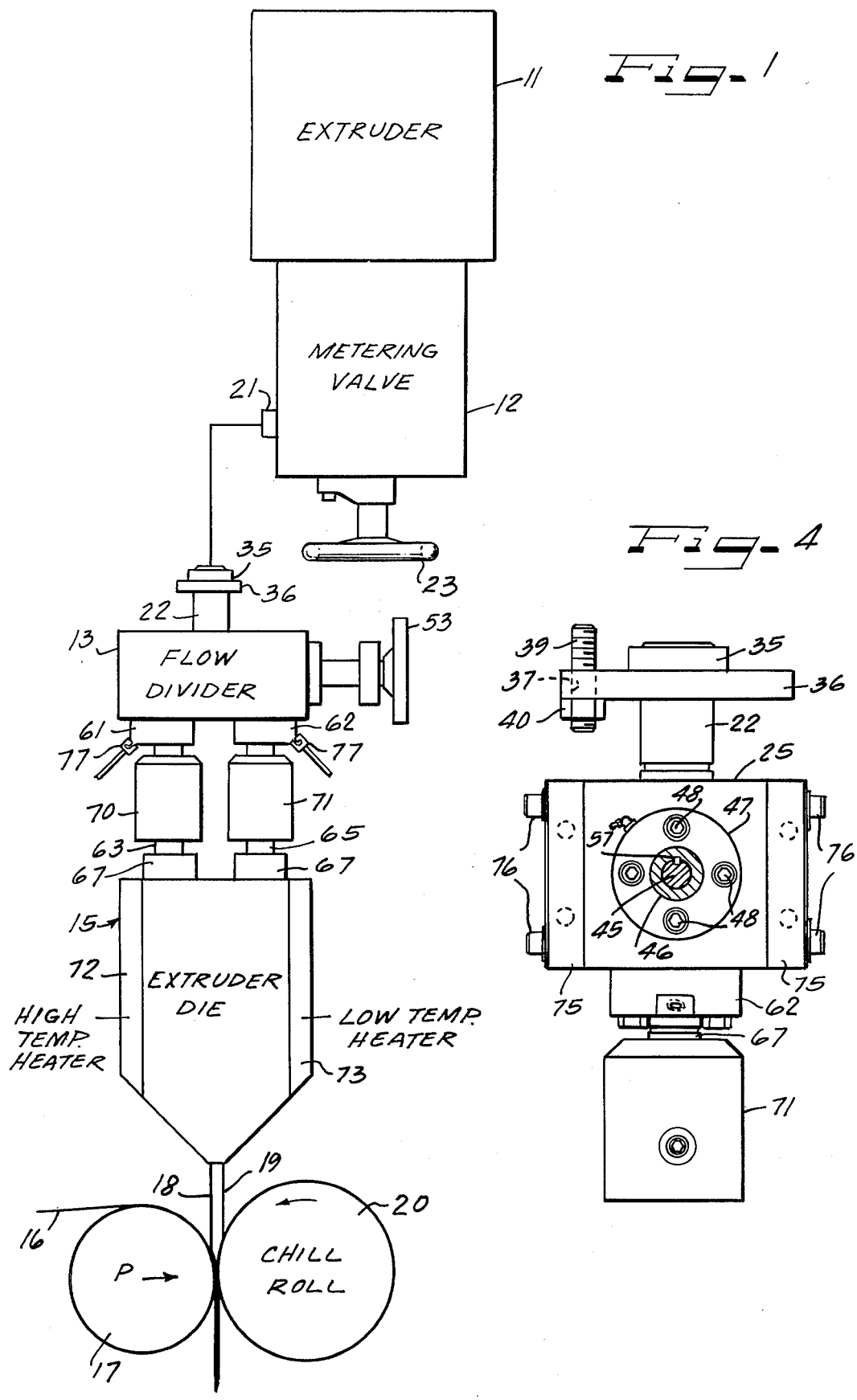

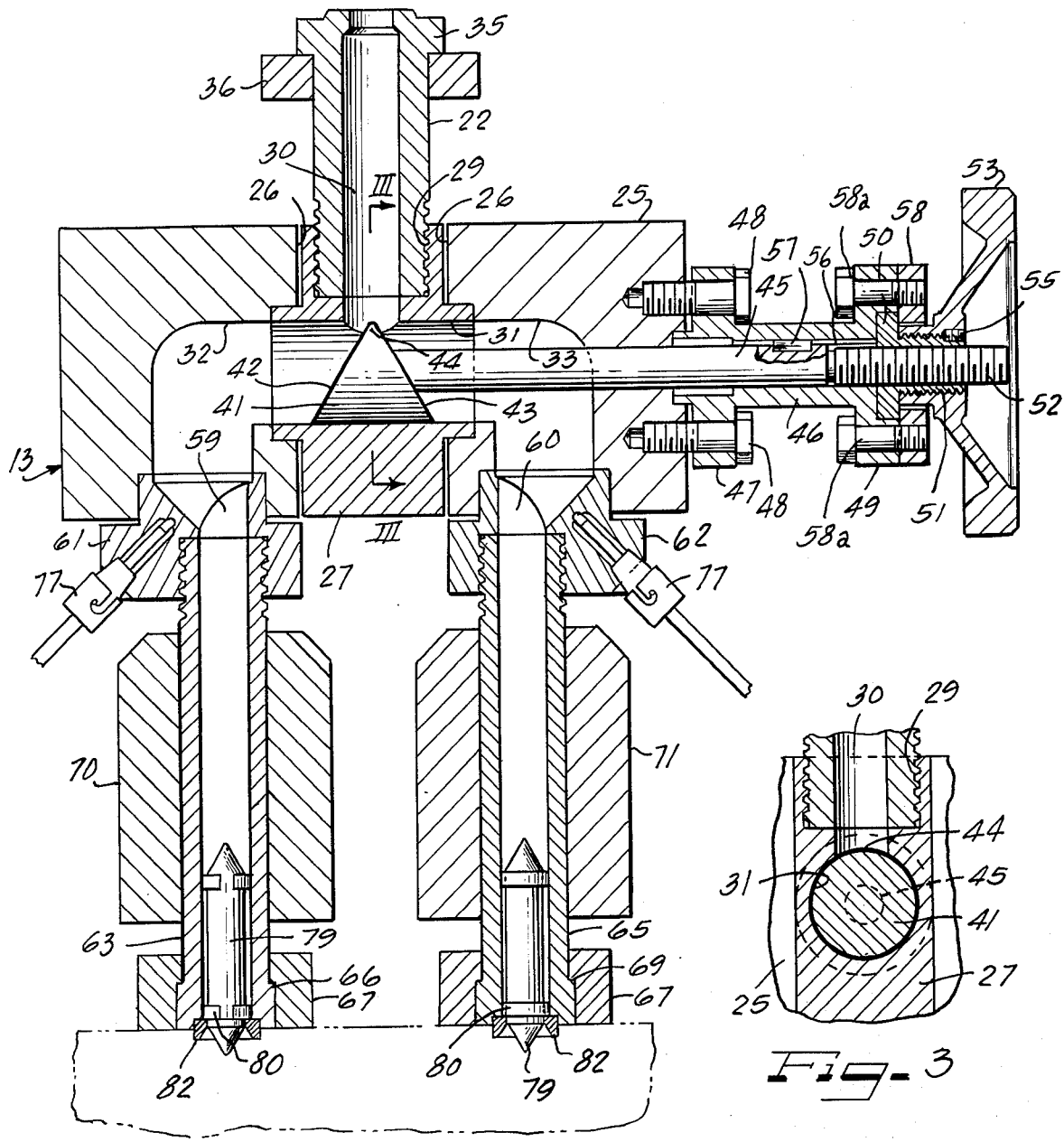

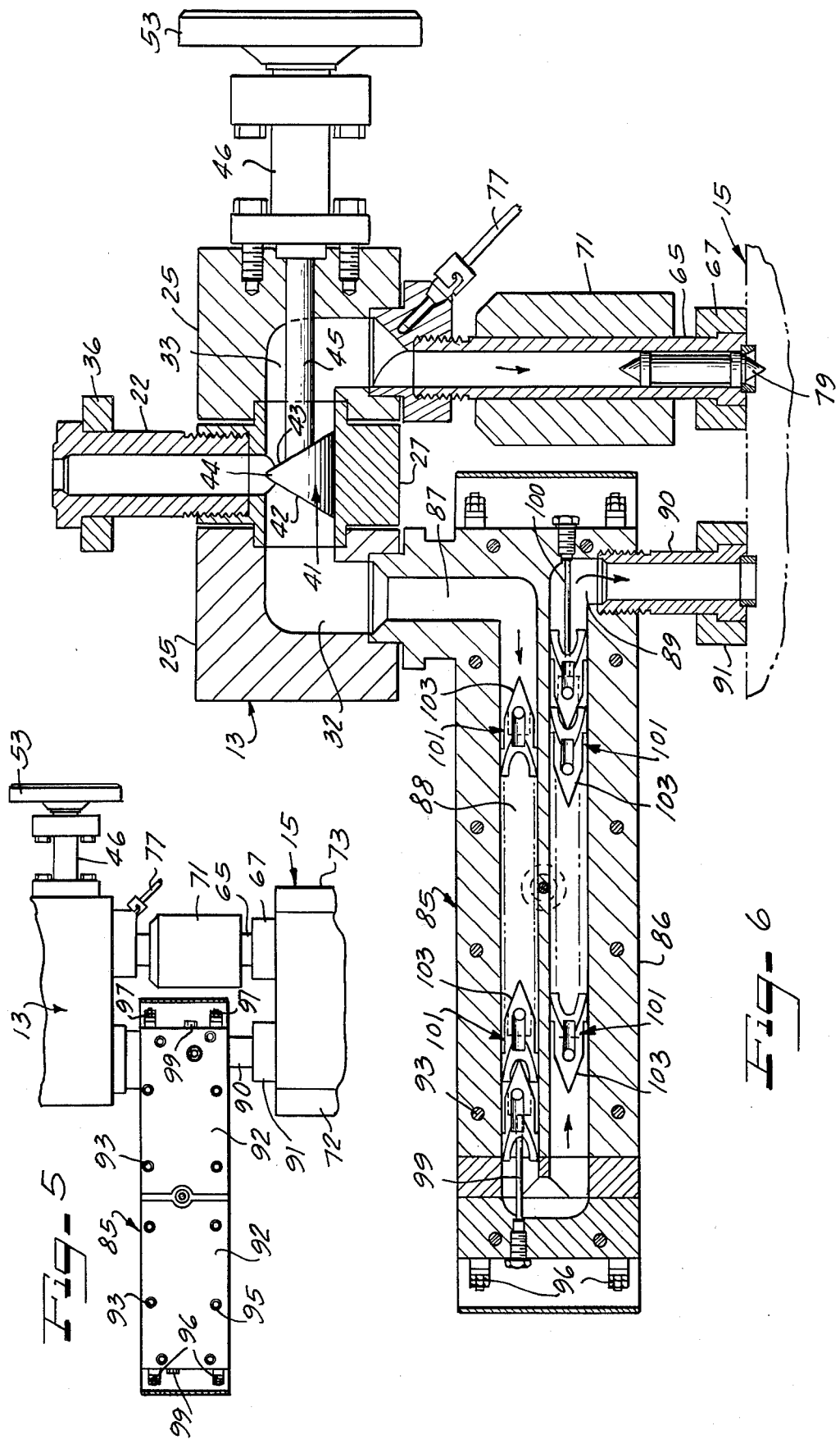

PLASTIC EXTRUSION AND ODOR ELIMINATION APPARATUS

FIELD OF THE INVENTION

Elimination of oxidized resin odor on an outside sheet of extruded plastic film.

BACKGROUND AND OBJECTS OF THE INVENTION

An article entitled "Extrusion Coating and Adhesive Lamination for Packaging Materials" published in PLASTICS DESIGN AND PROCESSING in the October, 1972 issue, recognizes that polyethylene odor is generally unacceptable for food packaging and the difficulty in reducing this odor. An article on page 548 of the Apr. 4, 1972 issue of Tappi discloses a dual slot die for heating plastic materials to different temperatures and discusses controls for the melt temperatures.

A Patent to Reifenhauser et at. U.S. Pat. No. 3,664,796 discloses a manifold arrangement for an extrusion assembly in which the manifold receives hot melt plastic from an extruder screw and divides the material to supply two melt streams to a plurality of extrusion dies.

By the process and apparatus of the present invention, a valve, which may be in the form of a manifold, is directly connected with a single extruder and divides the flow of hot plastic from the extruder into two streams and passes at least one of the streams through a tortuous path for an even melt flow and, in certain cases, for additional heating. The two flows of plastic material are then connected with a dual melt chamber dual slot die in which one melt chamber is heated to a higher temperature than the other, to supply plastic material to each chamber of the die in preselected proportions to effect the efficient bonding of the high temperature plastic material having good flow and adhesive qualities with the lower temperature material outside of the die.

It is also recognized that in order to increase the adhesive qualities of one of the plastic materials, it should be heated to a temperature above the oxidation temperature of the resin of the thermoplastic material. The other plastic material may then be heated to a temperature lower than the oxidation temperature of the resin of the thermoplastic material and will have no odor since the resin has not oxidized. In order to eliminate odor of the thermoplastic material heated to the higher temperature, the high and low temperature films are combined and the high temperature material is laid on a substrate, cooperating with the plastic material heated to the lower temperature and trapping the polyethylene odor caused by oxidation of the resin of the thermoplastic material.

An advantage of the present invention is the effectiveness of eliminating the oxidized resin odor of a high melt thermoplastic material by enveloping the oxidized resin between a low temperature plastic film and a substrate.

A further advantage of the present invention is the effective reduction of resin odor of a thermoplastic film used to coat another thermoplastic film by extruding the two films at different temperatures and combining the films outside of the die and laying the thermoplastic material having a resinous odor on a substrate.

A still further advantage of the invention is that two compatible thermoplastic materials may be heated to different temperatures in a single die, with one thermoplastic material passed through a tortuous path and heated to a high enough temperature to bond with a second thermoplastic material, and the two materials maintained at the required temperature when passing through the die and extruded through individual slots of the die and combined outside of the die, and odor may be effectively controlled by laying the high temperature film on a substrate.

A still further advantage of the invention is the simplicity and effectiveness of reducing thermoplastic resin odor by the provision of a flow divider valve dividing a single flow of hot melt plastic from an extruder into at least two flows, one of which is heated to a higher temperature than the other, and connecting the flow divider valve with a multi-manifold multi-slot die, arranged to maintain the material in one melt chamber at a higher temperature than that in the order and to accommodate bonding of the two materials to each other and to a substrate outside of the die.

Another advantage of the invention is the ability to control odor of a thermoplastic material heated above the oxidation temperature of its resin by the provision of a dual manifold, dual slot die, arranged to provide two flows of extruded material at different temperatures and to envelop the material heated to a high enough temperature to produce a resin odor, between the lower temperature material and a substrate, and thereby eliminate resin odor.

Other objects, features, and advantages of the invention will be readily apparent from the following description of preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view illustrating the steps of an odor control process as carried out in accordance with certain principles of the present invention.

FIG. 2 is a transverse sectional view taken through a flow divider valve utilized to carry out the invention to supply two streams of hot melt plastic to the extrusion die.

FIG. 5 is a transverse sectional view taken substantially along line III—III of FIG. 2, and illustrating the flow divider of the flow divider valve.

FIG. 4 is an end view of the flow divider valve with the adjustment shaft and support shown in transverse section.

FIG. 5 is a partial fragmentary view in side elevation of a modified form in which the invention may be embodied in which one film is passed through a heat exchanger along a tortuous path and heated to its high temperature while passing through this path; and FIG. 6 is a sectional view taken through the heat exchanger and flow divider valve as shown in FIG. 5.

DESCRIPTION OF PREFERRED EMBODIMENTS OF INVENTION

In FIG. 1 of the drawings, we have diagrammatically shown the apparatus for carrying out a extrusion coating and odor control system in accordance with the principles of the present invention as including an extruder 11 which may be of the screw or worm feeder type and forces the hot plastic into and through an extruder valve 12 which may screen and meter the plastic to a flow divider valve 13, dividing the flow and forcing the hot plastic through tortuous paths to provide an even melt run to a plurality of melt chambers (not shown) in an extruder die 15. The die 15 is arranged to heat the plastic to different temperatures in each melt chamber and extrude the plastic through extrusion nozzles, to be combined outside of the die and laid on a substrate 16 as turning about a pressure roll 17, biasing the substrate 16 to have a relatively high temperature plastic film 18 combined with a lower temperature plastic film 19 laid thereon under pressure and chilled by a chill roll 20, as passing through the pressure nip between the pressure roll 17 and chill roll 20.

The extruder 11 may be a conventional form of extruder in which a screw or worm extrudes a plastic material, which may be a polyethylene, heated in the extruder to an even flow temperature but below the oxidation temperature of the resin, as for example, a temperature of 580°F. The extruder 11 forces the material through the extruder valve 12 in which the melt flow is passed through a series of screens (not shown) and metered by a suitable metering valve (not shown) through an outlet 21 of the valve to an inlet fitting 22 of the flow divider valve 13.

The extruder valve 12 may be like that shown and described in U.S. Pat. No. 3,307,217, dated Mar. 7, 1967, which meters the hot melt plastic through screening means (not shown) under the control of a hand wheel 23. The extruder valve 12, therefore, need not herein be shown or described further, since it forms no part of the present invention, except insofar as it forms a screening and metering means for the hot melt plastic, and a means for supplying the screened and metered plastic to the inlet 22 of the flow divider valve 13.

The flow divider valve 13 is shown in particular in FIGS. 2, 3 and 4 of the drawings as including a valve body 25, shown as being in two parts, the parts of which are suitably secured together and sealed in a suitable manner. The adjacent body parts of the valve body 25 have aligned recessed portions 26 opening toward each other to define an opening and mounting for a center block 27 clamped between the body parts 25 and suitably sealed thereto. The center block 27 forms in effect a "T" and has a threaded passageway 29 extending thereinto and terminating into a smaller diameter passageway 30, leading to a larger diameter transverse passageway 31, opening at its opposite ends into aligned passageways 32 and 33 in the body parts 25. The threaded passageway 29 forms a threaded connection for the fitting 22 fitted to the outlet 21 of the extruder valve 12 and suitably sealed thereto. The fitting 22 has a flanged outer end portion 35 abutted by an adapter yoke 36. The adapter yoke 36 may be drilled in a plurality of places to provide holes 37 for studs 39 threaded in the outlet 21 of the extruder valve 12. Nuts 40 threaded on the outer ends of the studs 39 are adapted to draw the flange 35 into sealing engagement with said outlet and to thereby couple the fitting 22 and flow divider valve 13 to the outlet of the extruder valve 12. The nuts 40, drawing the yoke 36 and flange 35 into tight engagement with the outlet 21 in cooperation with the studs 39 and yoke 36, thus serve to rigidly connect said flow divider valve to the outlet 21 of the extruder valve.

The center block 27 thus accommodates the discharge of hot melt plastic through opposite ends of said fitting under the control of a flow divider 41. The flow divider 41 is shown as being generally cylindrical in form of an outside diameter having a sliding fit with the passageway 31. As shown in FIGS. 2 and 3, the flow divider has oppositely sloping faces 42 and 43 converging toward a peak 44 which may be close to the center line of the passageway 30, making allowance for an adjustment rod 45, to divide the flow equally between the passageways 32 and 33.

The flow divider 41 is slidably moved along the passageway 31 by the rectilinearly adjustably rod 45, welded or otherwise secured to the sloping face 43 of said valve and extending along the passageway 33 outwardly of the body part 25, through a support sleeve 46 for said shaft. Said support sleeve has an adapter flange 47 at the end thereof adjacent the body part 25, and retained to said body part as by machine screws 48 extending through the adapter flange 47 and threaded in the body part 25, as shown in FIG. 4. The support sleeve 46 also has a flange 49 at its outer end, recessed to receive a flange 50 of an internally threaded adjustment nut 51, threaded on a threaded end portion 52 of the shaft 45 and externally threaded for a hand wheel 53. The hand wheel 53 is threaded on the outer end of the nut 51 and is secured thereto to turn said nut upon turning movement of said hand wheel, as by one or more set screws 55.

The support sleeve 46 has a keyway 56 extending therealong and receiving a feather key 57, keyed to the shaft 45 and holding said shaft from rotation during turning movement of the nut 51 and hand wheel 53 and accommodating rectilinear movement of said shaft an adjustment of the flow divider to properly proportion the flow to the passageways 32 and 33 in the body part 25. A hold-down ring 58 is bolted to the flange 49 and engages the outer side of the flange 50 to hold said flange and the nut 51 from rectilinear movement upon adjustable movement of the shaft 45. The hold-down ring 58 may be suitably bolted to the flange 49, as by bolts 58a limiting inward movement of said hold-down ring relative to the flange 49 and preventing tightening of said hold-down ring against the flange 50 sufficient to retard rotation of said flanges.

The passageways 32 and 33 are shown as being elbow-like in form and open at right angles to the center line of the passageway 31 for discharging the hot melt plastic from the passageways 32 and 33 through right angled off-set reducer passageways 59 and 60 in reducer adapters 61 and 62. The off-set reducers 61 and 62 may be secured to the bottoms of the individual body parts 25 as by cap screws (FIG. 4). Adapters or couplers 63 and 65 are shown as being threaded in the respective off-set reducer passageways 59 and 60, and depending therefrom. The reducer adapters have shouldered bottom portions as indicated by reference numeral 66, and forming stops for the shoulders of die adapter rings 67, adapting the reducer adapters to the inlet passageways of the extruder 15 and securing the adapters 63 and 65 to said extruder to supply a thermoplastic mix to each melt chamber of the extruder die 15. The adapters 63 and 65 may be encircled by adapter heaters 70 and 71, respectively. The adapter heaters 70 and 71 may be resistor heaters to maintain the temperature of the plastic melt as extruded to the die at a preselected temperature range. The heaters may, if desired, supply the plastic melt to the extruder die 15 at different temperatures, to elevate the temperature of the plastic extruded through one adapter above that extruded through the other. The heaters 70 and 71 need not necessarily heat the adapters to different temperatures and the heating of the material in the two melt chambers and keeping the hot melt material to the desired temperature is attained by a high temperature heater 72 diagrammatically shown as extending along one side of the body of the extruder die 15 and a lower temperature heater 73 extending along the opposite side of the body of the extruder.

Opposite ends of the body parts 25 may be closed by resistor heaters 75 secured thereto as by cap screws 76. Thermocouples 77 may be inserted in the reducer adapters and serve to control the temperatures of the heaters 70, 71 and 75 and the interior temperature of the flow divider valve.

The respective reducer adapters 63 and 65 may each have a melt mixer 79 therein forcing the plastic melt to travel along a tortuous path prior to discharge from said adapters into the extruder 15. The melt mixers may be of a form known to those skilled in the art and providing passageways between lands 80 of the mixers, and through said lands, and being arranged to force the mix to pass from one passageway to the other through tortuous paths prior to discharge from the adapters, and to thereby effect a complete mix of the hot melt plastic and provide an even flow of the hot melt plastic to and through the die. The melt mixers may be press-fitted, or otherwise secured to the adapters and may be sealed to the die as by sealing rings 82 which may have sealing engagement with the body of the extruder die block. The adapter rings 67 afford a means for securing the adapters 63 and 65 in communication with the hot melt inlets (not shown) of the dual slot die 15, and may be secured to the body of said die to maintain the passageway leading through one adapter in communication with one melt chamber of the die and the passageway leading through the other adapter in communication with the other melt chamber of the die, as by machine or cap screws in a suitable manner, and no part of the present invention, so not herein shown.

The dual melt chamber dual slot die may be of a type similar to that shown and described in an application Ser. No. 316,863, assigned to the assignee of the present invention, filed by James J. Melead on Dec. 20, 1972, and no part of the present invention, so not herein shown or described further. The extrusion die of application Ser. No. 316,863 is shown as an end feed rather than a top feed extrusion die. The feed, however, may be either an end feed or top feed die and in the present application, top feed is preferable, since the die has only two melt chambers and two flows of thermoplastic material are supplied to the die.

The extruder die 15 and heaters 72 and 73, extending along opposite sides of the die are so arranged as to maintain one melt chamber at a temperature in the range between 520° and 580°F. which is beneath the oxidation temperature of the thermoplastic material, and maintain the other melt chamber at a higher temperature, as for example, in the range between 620° and 650°F. which is high enough to oxidize the resin of the thermoplastic material and provide good flow and adhesive qualities to the material, as combined with the film sheet extruded at the lower temperature.

The heaters 72 and 73 are controlled by individual thermostats and thermocouples (not shown) which may be capable of setting the heaters to different temperatures and maintaining the heaters at these temperatures as desired or required for good bonding qualities of the film 18 with the film 19.

As described herein, the plastic materials extruded through the die 15 may be the same material and may come from a common extruder and are divided and supplied to the die 15 in separate melt streams at different temperatures. This enables the plastic material heated to the higher temperature above the oxidation temperature of its resin and thus giving off an odor which can never be eliminated, to be bonded to the lower temperature thermoplastic material, sealing one side of the high temperature plastic material. The combined thermoplastic films may then be laid on a substrate extending along the high temperature side thereof and cooperating with the lower temperature plastic material to completely envelop the material heated to the higher temperature and contain the odor to this material and thereby eliminate all odor of the bonded sheet. This also reduces deterioration and pin holes in the completed sheet by closing the pin holes by the low temperature film and substrate.

The thermoplastic material is usually a polyethylene material, but may be a polypropylene or other plastic materials, such as modified polyethylenes, ionomers and other polymers.

The substrate 16 coated by the films 18 and 19, may be paper which is dry when coated so as not to curl. The substrate may even be an extruded plastic film, heated to the temperature of the plastic film 19 and extruded to cover the opposite side of the plastic film 18 from the plastic film 19. This may be supplied by a separate extruder die and the plastic film, while usually of the same material as the plastic films 18 and 19, may be of a different material to not only contain the odor to the high temperature plastic film, but also to provide a laminated sheet.

Where the substrate is paper, it may be dry and of a suitable type not subject to curling, as the high temperature film 18 is laid thereon, and in the end, resulting in a paper coated with plastic particularly suitable for packaging purposes.

In the form of the invention illustrated in FIGS. 5 and 6, we utilize the same extruder, metering valve and dual slot die as in the form of the invention illustrates in FIGS. 1 through 4. Like reference numerals, therefore, will be applied to the same parts in FIGS. 5 and 6 as are applied in FIGS. 1 through 4.

In the modified form of the invention, a heat exchanger 85 forms a more circuitous path for the high temperature stream than in the form of the invention illustrated in FIGS. 1 through 4, to give a larger area exposed to heat and a greater length of time for additional heat to soak into the plastic in the high temperature flow stream. The heat exchanger 85 is in the form of a block or body part secured to the bottom of the associated body part 25 in the same manner the reducer adapter 61 is secured to the body part 25 in the form of the invention illustrated in FIGS. 1 through 4. The heat exchanger 85 depends from the associated body part 25 and extends to one side of said body part. Said heat exchanger 85 has a passageway 87 in communication with the passageway 32 and turning at right angles to a looped passageway 88 having a rectilinear flow portion leading outwardly from said body part and then turning inwardly to a parallel rectilinear outlet flow portion and terminating into a right angled downwardly extending discharge passageway 89 having an adapter 90 threaded therein. The adapter 90 is similar to the adapter 63 of FIG. 2 and has an adapter ring 91 on the lower end thereof adapting the adapter to an inlet passageway of the extruder die 15 and securing said adapter thereto. Resistor heaters 92 extend along each side of the body part and in end-to-end relation along each side and are secured thereto as by machine screws 93 abutting spring washers 95 and tightened against said spring washers until a portion of the spring in the washers is taken up. Terminals 96 are provided at one end of the body part 86 to energize the resistor heaters at this end of the body part. Terminals 97 are provided at the opposite ends of the body part to independently energize the heaters at the adjacent end of the body part. A thermocouple 99 extends into the body part 85 along the rectilinear portion of the looped passageway 88 and serves to control the temperature of the adjacent resistor heaters 92 on opposite sides of the body part. A similar thermocouple 100 extends into the parallel rectilinear portion of the looped passageway. The melt mixers 101 are placed in end-to-end relation with respect to each other in the parallel rectilinear portions of the looped passageway 88 and may be of a form known to the art so only described in sufficient detail to render our invention readily understandable. Each melt mixer has a tapered end 103 facing the flow through the passageway and a wing-like trailing end engaging the wall of the passageway and holding the melt mixer in position in the passageway. The melt mixers are furrowed along the leading ends thereof and have passageways extending along the trailing ends thereof at right angles to the furrows extending along the leading ends and having communication with the furrows to provide a circuitous path for the plastic flow stream as passing along said melt mixers, in a manner similar to the melt mixer 79 in FIG. 2. The melt mixers 101 in the inlet rectilinear portion of the looped passageway 88 are retained in position in said passageway by the thermocouple 99. The melt mixers 101 in the parallel rectilinear portion of the looped passageway 88 in a like manner are retained in position by the thermocouple 100 leading into said looped passageway and abutting an end melt mixer.

The melt mixers 101 thus provide a tortuous or circuitous path for the plastic stream as passing along the looped passageway 88 to the inlet of the extruder die 15 and attain a thorough mixing of the high temperature plastic stream and provide a greater heat exchange area for the plastic stream and lengthen the time of passage along the heat exchanger from the form of the invention illustrated in FIGS. 1 through 4 to assure a thoroughly mixed stream heated to the preselected high temperature required to oxidize the resins of the thermoplastic material and thus break down the thermoplastic stream to give it good adhesive qualities to be bonded to the lower temperature plastic stream passing along the adapter 65 and melt mixer 79 into the low temperature side of the extruder die 15.

The extruder die 15 is like that diagrammatically shown in FIG. 1 and has a high temperature heater extending along the side thereof connected to the adapter 70 and a low temperature heater extending along the side thereof connected with the adapter 65. The high temperature heater 72 serves merely to maintain the temperature of the plastic stream as it passes into the melt chamber of the extruder die 15 to be extruded through an adjacent slot of the die in the form of a thin film. The heater 73 may supply additional heat to the low temperature plastic stream where the heater 71 may not be sufficient to bring the plastic stream up to temperature, but in many cases, may serve to maintain the temperature of the low temperature plastic stream sufficiently high to retain the flowability qualities of the plastic stream without breaking down the plastic. While the same form of melt mixer is shown in the adapter 65 in FIG. 6 as in the same adapter shown in FIG. 4, it should be understood that this melt mixer need not necessarily be used but that a melt mixer or a series of melt mixers like the melt mixers 101 may be placed in said adapter in end-to-end relation with respect to each other.

Except for the increased heating path along a heat exchanger 85 and melt mixers 101 in said heating path to give the plastic material more time for additional heat to soak into the plastic and to afford a greater heat exchange area for heating the plastic, the form of the invention illustrated in FIGS. 5 and 6 is carried out like that illustrated and described in connection with FIGS. 1 through 4 and there is no change in the carrying out of the extruding and bonding process even through the high temperature plastic film is brought up to temperature before entering the extruder die.

The apparatus of both forms of the invention just described attains an extrusion coating process in the form of laminating a substrate with polyethylene heated to a temperature high enough to break down the resins of the polyethylene and enclosing or enveloping the polyethylene subject to odor by a polyethylene heated to a lower temperature, below the break-down temperature of its resin and, therefore, not subject to odor, in such a way that both the substrate and polyethylene coating entirely contain the odor in the polyethylene heated to a higher temperature and, therefore, provide a coated substrate particularly useful for packaging materials for foods and other products and articles.

We claim as our invention:

1. In a flow divider valve for coating and deodorizing hot melt plastic and in combination with an extruder and a metering valve supplying hot melt plastic to the flow divider valve and a dual slot die downstream of the flow divider valve, for extruding two streams of hot melt plastic film at different temperatures for coating a substrate, a valve body having an inlet therein and spaced outlets leading from said valve body for connection with inlets of the duel slot die, a passageway in said valve body leading at right angles with respect to said inlet, and a flow divider slidably guided in said passageway and having a peak positionable in alignment with the center line of said inlet to equally divide the flow of hot melt plastic to flow along said passageway in opposite directions, said flow divider being generally cylindrical in cross section and having a sliding fit with said passageway and having oppositely sloping sides terminating into a peak conforming generally to the form of the passageway and movable along said passageway and inlet to divide the flow to flow in opposite directions along said passageway proportionate to the positioning of said peak along said inlet, and means adjustably moving said flow divider along said passageway and selectively proportioning the flow of hot melt plastic through said outlets.

2. The flow divider valve of claim 1, wherein a rod extends from said flow divider valve along said passageway through said housing, and means are provided for rectilinearly moving said rod to vary the position of said flow divider valve along said passageway and inlet to divide the flow to flow in opposite directions along said passageway in preselected proportions.

3. The flow control valve of claim 2, wherein the spaced outlets leading from the valve body are in the form of adapters, and wherein a melt mixer is carried in at least one adapter for forcing the plastic in a tortuous path and attaining an even mixture thereof as forced into said extrusion die.

4. The flow divider valve of claim 3, wherein heaters close opposite ends of said valve body and other heaters encircle said adapters to maintain the hot melt plastic at a uniform flow temperature as forced into said extruder die.

* * * * *